United States Patent Office 3,388,491
Patented June 18, 1968

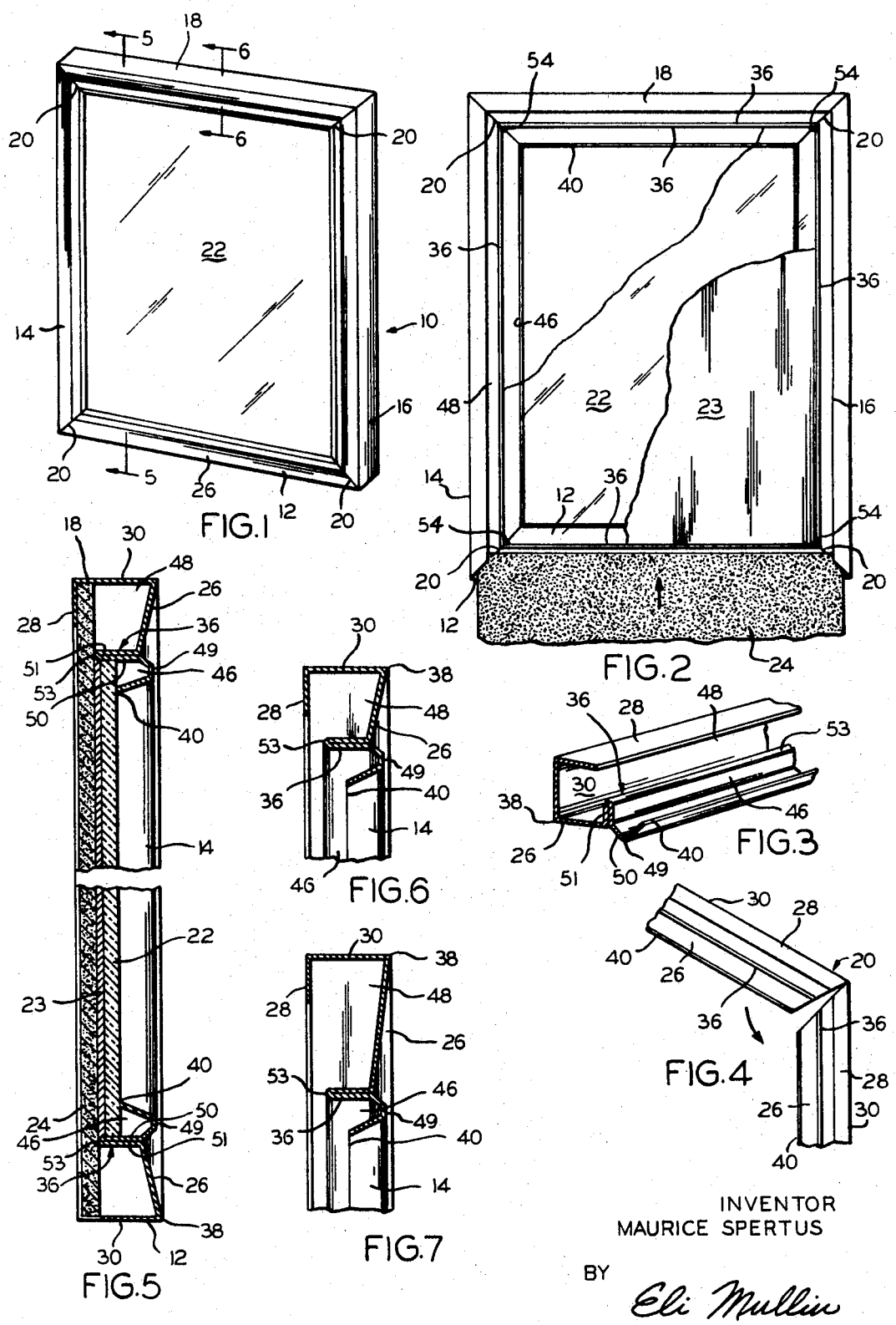
INVENTOR
MAURICE SPERTUS
BY
Eli Mullin
ATTORNEY

3,388,491
LARGE WIDTH METAL PICTURE FRAMES AND
CORNER JOINT THEREFOR
Maurice Spertus, Highland Park, Ill., assignor to
Metalcraft Corp., Chicago, Ill.
Filed Apr. 15, 1966, Ser. No. 542,901
5 Claims. (Cl. 40—152)

ABSTRACT OF THE DISCLOSURE

A picture frame moulding and picture frame made thereof has a ledge formed by crimping an intermediate portion of the front wall of the moulding, said ledge abuts the marginal edges of the picture thereby limiting the distance the picture and glass protrude into the moulding frame sides.

---

This invention relates generally to picture or photo frames and mouldings and more particularly to improvements in metal and the like picture frames and mouldings having a front wall with a substantial width dimension. The invention further relates to an improved corner joint for a metal or the like picture frame.

It is well known that picture frames, especially those made from metal, may be constructed from a single strip of material formed in substantially channel-like cross-sectional shape and miter cut at spaced intervals. The strip is then bent into a predetermined picture frame shape having mitered joints at the corners thereof. Such strips are commonly referred to as mouldings or moulding strips.

Although the picture frames formed in the above described manner were widely used heretofore, they nevertheless had many undesirable features and limitations. For example, if the front wall of these type frames had a large width dimension for esthetic appearances or for other reasons, it was extremely difficult to properly center the picture therein unless, of course, the picture was sized to extend within the channel of the frame to substantially the outer edges thereof. However the extension of the picture to the frame outer edges was usually objectionable and often unacceptable, due to the substantial portion of the picture or photograph cut off from view by the appreciable obstruction presented by the large width of the frame. Still a further undesirable feature of these prior type picture frames was the necessity to dimension the picture-protecting glass pane but slightly less than the outer picture frame perimeter in order to maintain the glass pane securely in place within the channel of the frame. Thus, the area size of the glass pane was determined by the area of the picture sight plus the width of the front wall of the frame moulding strip.

In view of the foregoing, it is a primary object of this invention to provide a metal picture frame which permits a picture to be quickly and properly centered regardless of the width of the front wall of the frame moulding.

It is another primary object to provide a picture frame in which the exposed portion or sight of a picture or photograph inserted therein is independent of the width of the front wall of the frame moulding.

Another object is to provide a picture frame in which the area size of the glass pane positioned therein is independent of the width of the front wall of the frame moulding.

It is a primary feature of this invention to provide a ledge positioned on the inside of a picture frame in spaced relationship with the inner and outer edges of the front wall of the frame which enables a standard sized picture or photo to be easily and quickly centered within the picture frame regardless of the width of the front wall of the frame moulding. It is a related feature to provide a ledge positioned as indicated hereinabove so as to enable the exposure of the picture to be controlled independent of the width of the frame.

A further objection to the aforedescribed prior metal frames was the problem of providing a firm and secure connection at the corner joints and especially at the joint formed by the butting free ends of the single moulding strip from which the frame shape was made. Particularly for the large width frames, it was extremely difficult heretofore to achieve secure joint connections which were not susceptible to being bent out of shape due to the flexibility of the metal material normally used. Moreover, since the connection of one or more of the corner joints usually required the joining of front walls of adjacent frame segments, the utmost care was absolutely necessary in order not to mar the esthetic appearance of the frame. In many instances, an ornament was positioned at the corners of the picture frame to cover surface irregularities which were inevitably caused in the process of making the connections at one or more of the corners. Thus, an arc weld which would afford a secure bond at the frame corners could not be used because of the almost certainty that it would cause irreparable damage on the front surface of the frame. Hence, heretofore, the users of these prior frames had no alternative, but to sacrifice rigidity in the corner joint connections for the esthetic appearance of the frame.

Therefore, it is another primary object of this invention to provide a metal picture frame capable of being rigidly connected at the corner joints without affecting the esthetic appearance of the frame.

It is another object to provide a picture frame which permits an arc weld or similar means for fusing material to be made at the corner joints without affecting the esthetic appearance of the frame.

Therefore, it is another primary feature of this invention to provide a corner joint comprising a ledge extending outwardly toward the rear of the frame from the inner surface of the front wall of a frame segment in an abutting relationship with a ledge similarly extending outwardly from an adjacent frame segment, thereby permitting these adjacent ledges to be fused together at a safe distance from the decorative exposed front wall of the frame by means of an arc weld or the like.

With the foregoing and other objects and features in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a perspective front elevational view of a picture frame embodying the principles of the invention;

FIG. 2 is a rear view of the picture frame showing portions of the picture framing elements enclosed by the frame;

FIG. 3 is a rear fragmentary perspective view of a moulding frame segment other than the bottom frame segment of the picture frame of FIG. 1;

FIG. 4 is a fragmentary rear view of a corner miter joint with opposed contacting parts thereof spaced slightly apart;

FIG. 5 is a cross-sectional view taken on the line of the plane 5—5 in FIG. 1, viewed in the direction indicated, and showing the position of the picture and framing elements enclosed by the frame;

FIG. 6 is a cross-sectional view of the top frame segment taken on the plane of the line 6—6 in FIG. 1, viewed in the direction indicated, but with the elements enclosed by the frame removed; and FIG. 7 is a cross-sectional view of a top moulding frame segment similar to FIG. 6, but with a substantially greater width dimension across the front wall thereof.

Turning now to the several figures of the drawings, reference numeral 10 indicates generally a picture frame embodying the principles of the present invention. Picture frame 10 may have any suitable outer configuration, but in the embodiment illustrated the same is substantially rectangular in shape and comprises a bottom frame segment 12, a pair of side frame segments 14 and 16 and a top frame segment 18. The various frame segments may be formed from a single moulding strip of metal or the like, miter cut at spaced intervals and bent to form the miter joints 20 at the corners of the frame 10. As shown in FIG. 2, a glass pane 22, a picture or photo 23 and a support backing member 24 usually made from cardboard or the like, are positioned within the frame 10.

Three of the frame segments comprise a front wall 26, a rear wall 28 with an integrally formed side wall 30 therebetween (see FIG. 3). The remaining frame segment preferably does not include a rear wall 28 in order to facilitate the insertion in and the removal from the frame of the support back member 24 (FIG. 2). In the illustrated embodiment, rear wall 28 is omitted from the bottom frame segment 12 (FIGS. 2 and 5).

As shown in FIGS. 2 through 7 inclusive, a ledge 36 extends outwardly toward the rear of the frame from the inside surface of the front wall 26 of each frame segment in spaced relationship with the outer and inner edges 38, 40 thereof, thereby dividing the inside of the frame segments into an inner section 46 and an outer section 48. Ledge 36 spans across the entire longitudinal length of the individual frame segments 12, 14, 16 and 18 with the lateral edges thereof abutting against each other at the miter joints 20, to provide a continuous ledge 36 extending around the inside of frame 10 (see FIG. 2). The picture 23 is positioned within the area defined by the ledges 36 and prevented by the ledges 36 from extending into the outer sections 48 of the frame segments (see FIG. 5). Ledge 36 is so positioned between the extreme edges 38, 40 of the front wall 26 that the inner portion 49 of the front wall (FIG. 5) between ledge 36 and the inner edge 40 of each frame segment provides a narrow but adequate marginal border encompassing the picture 23 when the same is positioned in the enclosed area defined by the ledge 36 of the frame segments. For standard sized pictures, the proper border is readily predetermined. Thus, as shown by comparing the cross-section in FIG. 6 of frame 10 with the cross-section of a frame in FIG. 7 having a substantially larger front frame width, the inner portion 49 of the front of the frame bordering the picture 23 is the same regardless of the total width dimension of the front of the frame. Hence, by providing ledges 36 the exposure of picture 23 is independent of the front width of the frame moulding. Moreover, with the distance that the picture extends into the frame moulding limited by ledges 36, a picture is quickly and easily centered as if it were being inserted into a narrow width frame.

As will be noted by viewing FIGS. 3 and 5, ledge 36 may be formed by crimping intermediate portions of the front wall to form superimposed portion 50, 51. In this manner, the entire frame 10 including the ledges 36 may be easily formed from a single strip of moulding material.

As seen in FIGS. 2 and 5, the area of the glass pane 22 is substantially equivalent to the area enclosed by the ledge 36. Therefore, regardless of the width of frame 10, the area of the glass pane 22 is determined merely by the enclosed area defined by the ledges 36.

Turning now to FIG. 5, it will be seen that the clearance between the inner edge 40 of front wall 26 and the peripheral edge 53 of ledge 36 must be at least equal to the thickness of the glass pane 22 and the picture 23 in order to confine the same within the area enclosed by ledges 36. To fully utilize the support backing member 24 which, as shown, has a thickness substantially equal to the distance between the peripheral edge 53 and the rear wall 28, the clearance between inner edge 40 and peripheral edge 56 is preferably made substantially equal to the thickness of the glass and the picture. In this manner, the glass pane 22 and picture 23 are securely positioned between the inner edge 40 of front wall 26 and the support backing member 24. For the normally used glass and picture, a clearance of one-fourth (¼) inch is acceptable.

Therefore, to insert the framing parts into frame 10, it is merely required to place the glass pane 22 and then the picture 23 into the area defined by ledges 36. Thereafter, the support backing member 24 is inserted from the bottom into the frame 10. The support backing member 24 maintains the glass pane 22 and picture 23 securely in place within the area defined by the ledges 36. Note that only the support backing member 24 extends within both the inner and outer sections 46, 48 of frame 10. To provide maximum support the backing member 24 is dimensioned to fit tightly within the frame moulding. Hence, by varying the width of the frame and maintaining the area defined by the ledges 36 constant, only the support backing member 24 need vary in area size to maintain the proper and secure support for the picture and glass.

In addition to providing a means for quickly centering and limiting the unexposed area of a standard picture within large width frames, the ledges 36 also afford a means to enable a firm and secure attachment to be made at the corners of the frame moulding where edges of adjacent frame segments abut each other. The abutting adjacent edges of ledges 36 of the frame segments afford sufficient contacting area indicated by the reference numeral 54 in FIG. 2, to securely attach these frame segments together. Moreover, since the ledges 36 extend inwardly from the decorative front wall toward the rear of the frame moulding, a secure and rigid attachment of adjacent frame segments may be made at the peripheral edges 53 of the ledges 36 without fear of damaging or marring the decorative front wall. Thus, in the illustrated embodiment the outer surfaces of the folded over portions 50, 51 of adjacent ledges 36 may be secured together at one or more of the corners 20. Hence, an arc weld or similar means for fusing material may be used for providing a rigid attachment at the contacting area 54 of adjacent ledges 36 at the corner 20.

Furthermore, by having the adjacent edges of the ledges 36 connected together, a rigid supporting brace is thereby provided between the inner edge 40 and the outer edge 38 of front wall 26 of the frame moulding. The bracing thus provided by the ledges 36 prevents the frame 10 from being bent out of shape or spreading apart at the corners. This bracing is of particular importance for the very large width frames which heretofore had the tendency to permanently distort and spread apart at the corners.

From the above description and drawings, it should be apparent that novel moulding strip has been provided by the invention herein to enable large width picture frames of metal or the like to be used without substantially reducing the exposure of the picture inserted therein. A ledge 36 is disposed inside and between the inner and outer edges of the front of the frame moulding which enables the exposed portion of the picture to be determined independent of the total width of the frame. Hence, the front frame moulding may be substantially increased without affecting the exposure of the picture. Moreover, with the novel frame of the present invention, the area size of the glass pane is determined by the area defined by ledges 36 rather than the area defined by the outer edge of the large width frame. Thus, the large width frames herein require substantially less glass material in order to effectively protect the picture.

Furthermore, the novel ledge 36 formed to the front wall and extending to the rear of the frame enables a secure joint connection to be made at the corners 20 of the frame without marring the esthetic appearance of the frame. In addition, ledge 36 braces the frame and thereby prevents distortion in the frame due to the flexibility of the frame moulding material.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A strip of moulding for a picture frame comprising:
   a front wall having an inner and outer edge defining the front width of said picture frame;
   means disposed within said moulding between the inner and outer edges of said front wall to limit the distance a picture extends within said moulding independent of the width of the front wall of the frame;
   said strip of moulding being substantially channel shaped, mitered at spaced intervals and bent to afford a substantially rectangular configuration for said frame, said frame having a top segment, a bottom segment and a pair of side segments, each of said segments including said front wall in the front thereof;
   a ledge disposed within each of said segments between the inner and outer edges of the front wall to define an area for operatively positioning said picture, the portions of the front wall between the inner edge of the front wall of each of said segments and the corresponding ledge providing a marginal border around the picture;
   each of said ledges extending outward from the inside surface of the front wall toward the rear of said frame to partition the inside of the picture frame into an inner and outer section, the inner section extending between the inner edge of the front wall and the ledge and the outer section extending between the outer edge of the front wall and the ledge, the clearance between the inner edge of the front wall and the peripheral edge of each ledge being dimensioned to at least equal the thickness of the glass pane and the picture, thereby containing the picture and the glass pane within the area defined by said ledges and preventing the same from extending into the outer section of the frame when the picture and glass pane are operatively positioned in the frame moulding;
   and each of said ledges comprising crimped intermediate portions of the front wall superposed on each other.

2. A strip of moulding as claimed in claim 1 wherein the ledges of adjacent frame segments are in an abutting relationship at the corners of the frame, at least one of the corners of the frame having the abutting ledges rigidly connected together, the intermediate portions of adjacent ledges being fused together adjacent the peripheral edges of the ledges.

3. A strip of moulding for a picture frame comprising:
   a substantially channel shaped member having at least a front wall with integrally formed spaced apart inner and outer legs;
   means positioned in said member intermediate said inner and outer legs and adapted to abut the marginal edges of a picture positioned in said picture frame;
   said means comprising a ledge protruding inwardly from said front wall and formed of crimped intermediate portions of said front wall.

4. A picture frame comprising:
   a length of substantially channel shaped moulding strip mitered and bent to afford a substantially rectangular frame;
   each side of said rectangular frame having at least a front wall with an integrally formed outer wall at one edge thereof and an inner wall at the other edge thereof;
   a ledge protruding inwardly from said front wall and formed of crimped intermediate portions of said front wall;
   said ledge positioned in spaced relationship with said inner and outer walls and defining the area within which to operatively position a picture in said picture frame.

5. The picture frame of claim 4 in which at least three sides thereof include a rear wall integrally formed to said outer wall, said inner wall lying in a plane inclined to the plane of said outer wall, and the inner end of said inner wall lying in a plane spaced outwardly from the plane of the inner end of said ledge.

References Cited
UNITED STATES PATENTS

| | | | |
|---|---|---|---|
| 1,634,921 | 7/1927 | Straus | 40—152 |
| 2,521,603 | 9/1950 | Prew | 40—152 |
| 2,577,982 | 12/1951 | Traum | 40—152 |
| 2,811,799 | 11/1957 | Clark | 40—152 |
| 3,205,599 | 9/1965 | Spertus | 40—152 |

FOREIGN PATENTS 794,459   5/1958   Great Britain.

EUGENE R. CAPOZIO, *Primary Examiner.*

WENCESLAO J. CONTRERAS, *Examiner.*